April 18, 1950     J. VOSBIKIAN     2,504,766
LATCHING MECHANISM FOR BLADED TOOLS
Filed Feb. 12, 1947
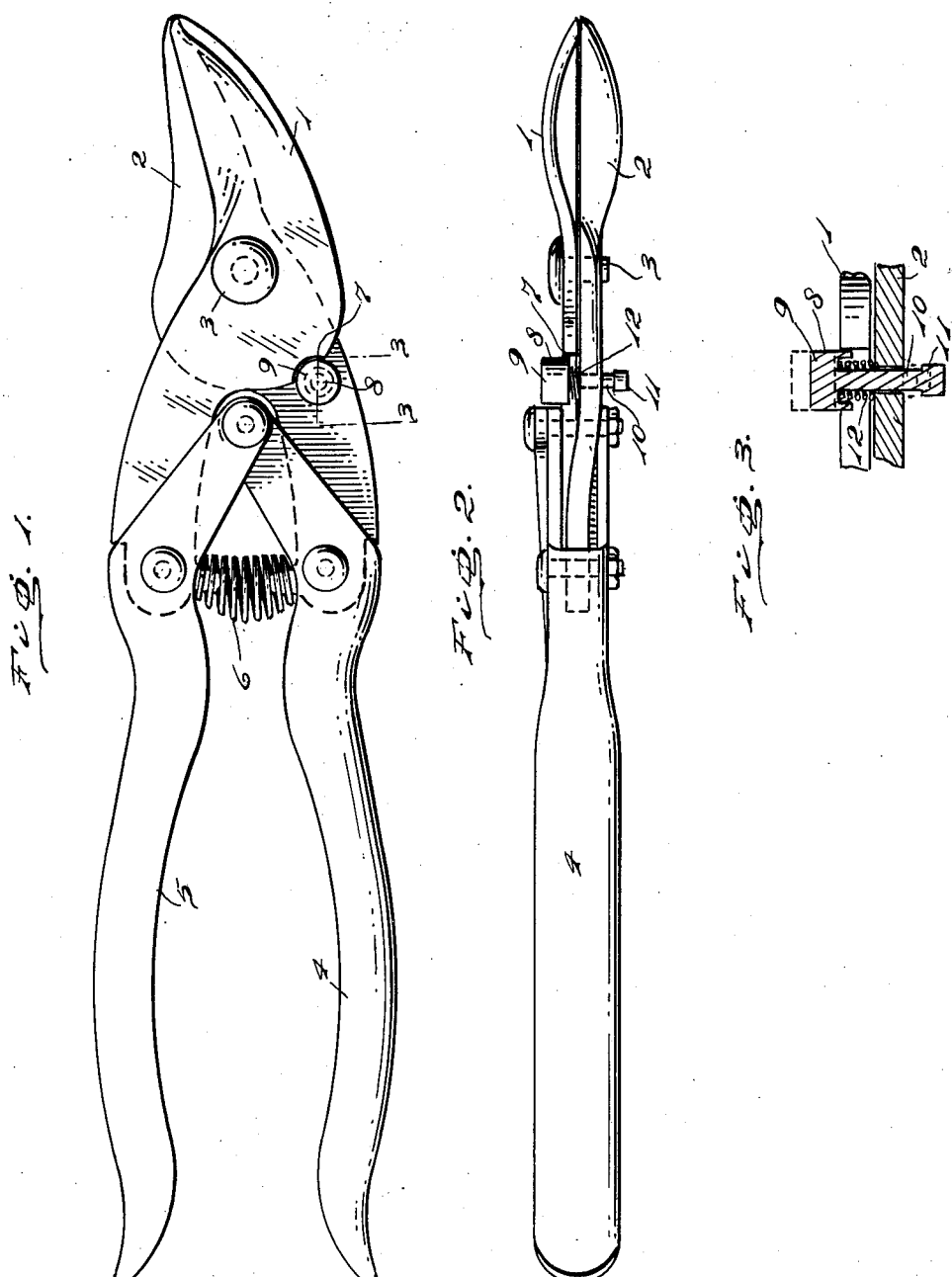
INVENTOR.
James Vosbikian
BY
Herbert S. Fairbanks
ATTORNEY.

Patented Apr. 18, 1950

2,504,766

UNITED STATES PATENT OFFICE 2,504,766

LATCHING MECHANISM FOR BLADED TOOLS

James Vosbikian, Philadelphia, Pa., assignor to Hancock Tool Manufacturing Company, Philadelphia, Pa., a corporation of Pennsylvania Application February 12, 1947, Serial No. 728,003

2 Claims. (Cl. 30—262)

The object of this invention is to devise a novel latching mechanism for bladed members which will be simple, effective and durable.

To this end, I have devised a novel latching mechanism to retain blades in their closed condition when not in use, and which can be actuated by the hand of the operator that holds the tool to effect the locking operation, and which is released by pressure of the handles of the tool.

With the foregoing and other objects in view as will hereinafter clearly appear, my invention comprehends novel latching mechanism for blades of tools.

It further comprehends a novel latching mechanism, comprising a spring pressed latch mounted on one blade to move at right angles thereto to engage a notch in the other blade.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized and the invention is not limited to the exact arrangement and organization of these instrumentalities as herein set forth.

Figure 1 is a top plan view of bladed members, in conjunction with which latching mechanism embodying my invention is employed.

Figure 2 is a side elevation.

Figure 3 is a section on line 3—3 of Figure 1.

Similar numerals of reference indicate corresponding parts.

Referring to the drawings:

The blades of the tool may be adapted for cutting, gripping or holding, and for purpose of illustration of one type of tool I have shown in the drawings what is known in the trade as aviation snips.

Blades 1 and 2 of the tool are pivoted together at 3, and their rear ends are connected to handles 4 and 5 in any conventional or well known manner to provide a simple or compound leverage. A spring 6 interposed between the handles effects the opening movement of the blades.

The blade 1 at its rear or heel portion is provided with a notch 7. A latch 8 has a rounded head 9 and a shank 10 which latter extends through the blade 2 at right angles thereto and is headed at 11. A spring 12 encircles the shank 10 between the blade 2 and the head 9, and tends to retain the latch in its unlatched position.

The operation of the latching mechanism will now be apparent to those skilled in this art and is as follows:

If it is desired to lock the blades in their closed condition, the handles of the tool are pressed together and the head 9 moved inwardly so that the latch interlocks with the walls of the notch 7 in the blade 1. Since the spring 6 tends to open the blades, its tension causes the latch to be retained in contact with the walls of the notch.

The handles are pressed together to release the latch, and the latch spring moves the latch outwardly of its blade.

It will thus be clear that the locking and releasing of the latch can be accomplished by the hand that is holding the tool.

Having thus described my invention, what I claim as new and desire to secure by Letters Patent is:

1. Latching mechanism for bladed tools having blades pivoted together, handles for the blades and a spring tending to open the blades, one of said blades having a notch opening through its rear portion, and a latch in the form of a straight headed plunger carried by and movable through the other blade to move at right angles to it and manually movable towards its blade to engage the walls of said notch and retain the blades in their closed condition and a spring between the latch and its blade to move the latch into unlatched position.

2. Latching mechanism for bladed tools, comprising blades, a pivot connecting the blades, handles connected with the blades, a spring between the handles, one of the blades having a notch at its rear portion, a plunger carried wholly by the other blade and having a shank laterally movable through such blade, one end of said shank being headed and the other end of said shank having a rounded head to be received in said notch, and a spring between said rounded head and the plunger carrying blade and maintaining said plunger in its unlatched position, said plunger spring when the rounded head is in the notch and the handles are pressed together moving said rounded head out of the notch.

JAMES VOSBIKIAN.

REFERENCES CITED

The following references are of record in the file of this patent:

UNITED STATES PATENTS

| Number | Name | Date |
| --- | --- | --- |
| 534,064 | Hansen | Feb. 12, 1895 |
| 2,295,385 | Connors | Sept. 8, 1942 |
| 2,306,506 | Simonsen et al. | Dec. 29, 1942 |